United States Patent
Hanes et al.

(10) Patent No.: US 11,228,828 B2
(45) Date of Patent: Jan. 18, 2022

(54) ALERTING USERS TO EVENTS

(71) Applicant: HEWLETT-PACKARD DEVELOPMENT COMPANY, L.P., Houston, TX (US)

(72) Inventors: David H. Hanes, Fort Collins, CO (US); Jon R. Dory, Fort Collins, CO (US); John Michael Main, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 722 days.

(21) Appl. No.: 16/076,382

(22) PCT Filed: Jul. 14, 2017

(86) PCT No.: PCT/US2017/042152
§ 371 (c)(1),
(2) Date: Aug. 8, 2018

(87) PCT Pub. No.: WO2019/013820
PCT Pub. Date: Jan. 17, 2019

(65) Prior Publication Data
US 2021/0176554 A1    Jun. 10, 2021

(51) Int. Cl.
*H04R 1/10* (2006.01)
*G06F 16/68* (2019.01)
(Continued)

(52) U.S. Cl.
CPC .......... *H04R 1/1041* (2013.01); *G06F 3/041* (2013.01); *G06F 16/68* (2019.01); *G06N 20/00* (2019.01);
(Continued)

(58) Field of Classification Search
None
See application file for complete search history.

(56) References Cited

U.S. PATENT DOCUMENTS 5,519,783 A * 5/1996 Kumar ................ H04R 1/1008
181/129
5,864,989 A   2/1999 Funatsu
(Continued)

FOREIGN PATENT DOCUMENTS

CN    201156817 Y    11/2008
CN    101494811 A     7/2009
(Continued)

OTHER PUBLICATIONS

O'Kane, "Smart Headphones With Voice Recognition Could Help You Miss Fewer Conversations", The Verge, Retrieved from internet—https://www.theverge.com/circuitbreaker/2016/12/5/13841776/stages-hero-headphones-noise-cancellation-augemented-sound, Dec. 5, 2016, 4 Pages.
(Continued)

*Primary Examiner* — Qin Zhu
(74) *Attorney, Agent, or Firm* — Fabian VanCott (57) ABSTRACT

Headphones includes a pair of cups, each housing a speaker to be positioned over an ear of a user, a microphone, a processor, an actuator to move a member of at least one of the cups to uncover at least a portion of the ear of the user to expose the user to ambient sound, a user control to active a training mode of the headphones in which the processor operates the microphone to record relevant sounds occurring when the training mode is activated, the processor to subsequently analyze ambient sounds external to the headphones that are received by the microphone and compare those ambient sounds to the recorded relevant sounds and the processor to selectively activate the actuator to uncover at least a portion of the ear of the user to expose the user to ambient sound in response to determining that the ambient sounds match the relevant sounds.

20 Claims, 9 Drawing Sheets

(51) Int. Cl.
*G06N 20/00* (2019.01)
*G06F 3/041* (2006.01)
*G10L 25/51* (2013.01)
*H04R 1/08* (2006.01)
*G10K 11/178* (2006.01)
*H04M 1/60* (2006.01)
*H04M 1/19* (2006.01)

(52) U.S. Cl.
CPC ............... *G10L 25/51* (2013.01); *H04R 1/08* (2013.01); *H04R 1/1008* (2013.01); *H04R 1/1058* (2013.01)

(56) References Cited

U.S. PATENT DOCUMENTS

| | | | |
|---|---|---|---|
| 9,208,769 | B2 | 12/2015 | Azmi |
| 9,270,244 | B2 | 2/2016 | Usher et al. |
| 9,664,902 | B1 | 5/2017 | Raffle |
| 2001/0046304 | A1 | 11/2001 | Rast |
| 2003/0215108 | A1 | 11/2003 | Shelley et al. |
| 2005/0105755 | A1 | 5/2005 | Yueh |
| 2006/0017654 | A1 | 1/2006 | Romo |
| 2010/0095439 | A1 | 4/2010 | Nolan |
| 2011/0268290 | A1 | 11/2011 | Lee |
| 2012/0207320 | A1 | 8/2012 | Avital |
| 2015/0222980 | A1* | 8/2015 | Pizzaro ................ H04R 1/1058 381/371 |
| 2015/0281829 | A1 | 10/2015 | Gauger, Jr. |
| 2015/0302651 | A1 | 10/2015 | Shpigelman |
| 2016/0192050 | A1 | 6/2016 | Masaki |
| 2016/0323664 | A1 | 11/2016 | Kirsch |
| 2016/0330537 | A1* | 11/2016 | Barrentine ....... G10K 11/17881 |
| 2016/0381415 | A1 | 12/2016 | Vijay |
| 2016/0381450 | A1* | 12/2016 | Taite ........................ G08B 3/10 381/74 |
| 2017/0049335 | A1 | 2/2017 | Duddy |
| 2017/0099539 | A1 | 4/2017 | Di Censo |
| 2017/0127168 | A1* | 5/2017 | Briggs ................. H04R 1/1058 |
| 2018/0192179 | A1* | 7/2018 | Liu ....................... H04R 1/1083 |
| 2020/0241834 | A1* | 7/2020 | Boeen ..................... G10L 25/51 |

FOREIGN PATENT DOCUMENTS

| | | |
|---|---|---|
| CN | 101513083 B | 9/2011 |
| CN | 202261733 | 5/2012 |
| CN | 102647640 A | 8/2012 |
| CN | 205408108 U | 7/2016 |
| CN | 106851448 A | 6/2017 |
| CN | 106445176 B | 10/2018 |
| EP | 3089474 | 10/2003 |
| WO | WO-2015163913 A1 | 10/2015 |
| WO | WO-2015192117 A1 | 12/2015 |
| WO | WO-2016161450 A1 | 10/2016 |

OTHER PUBLICATIONS

Miletic, B., Air-cooled Gamers Headsets, <http://www.cybershack.com.au/news/air-cooled-gamers-headsets>.

* cited by examiner

| Assigned Priority Levels 218 |||
|---|---|---|
| Activity(s) 220 | Priority Level(s) 542 | Activate Actuator(s) 544 |
| Listening To Music 220-1 | Low 542-1 | Yes 544-1 |
| Receiving A Phone Call 220-2 | High 542-2 | No 544-2 |
| Watching A Movie 220-3 | Medium 542-3 | Depends 544-3 |
| Playing A Video Game 220-4 | Low 542-4 | Yes 544-4 |

ALERTING USERS TO EVENTS

BACKGROUND

A device, such as a smart phone, a tablet, an MP3 player, a computer, a head-mounted display (HMD), among other devices is used to immerse a user in audiovisual media. To immerse the user in audiovisual media, a device includes a display and connects to other devices such as headphones. The headphones are designed to be worn on or around the head of the user and over the user's ears. The headphones present information to the user in an audio form. The user manually manipulates controls on the device to control the audiovisual media outputted to the display and the headphones.

BRIEF DESCRIPTION OF THE DRAWINGS

The accompanying drawings illustrate various examples of the principles described herein and are a part of the specification. The examples do not limit the scope of the claims.

FIG. 6 is a flowchart of a method for alerting a user to an event, according to one example of principles described herein.

Throughout the drawings, identical reference numbers designate similar, but not necessarily identical, elements.

DETAILED DESCRIPTION

As noted above, to immerse the user in audiovisual media, a device includes a display and connects to another device such as headphones. Headphones are often designed to block out ambient sounds. For example, some headphones have large pads that surround the outer ear of the user. This allows the headphones to fully seal against the ears of the user to attenuate ambient sounds. Active noise-cancelling headphones use a microphone, amplifier, and speaker to pick up, amplify, and play ambient sounds in phase-reversed form. This cancels out unwanted noise from the user's surroundings without affecting the audiovisual media playing on the device.

Because headphones are designed to block out ambient sounds, the user can be oblivious to a person trying to verbally get their attention. This leads to the person verbally shouting to get the user's attention or the person physically touching the user to get the user's attention. This can lead to frustration since the user may be ignoring that person simply because the user is unaware of the person trying to get their attention. Further, the user needs to physically remove the headphones to have a conversation with people in the surrounding area.

Consequently, the present specification describes, for example, a set of headphones. The set of headphones includes a pair of cups, each housing a speaker to be positioned over an ear of a user, a microphone, a processor, an actuator to move a member of at least one of the cups to uncover at least a portion of the ear of the user to expose the user to ambient sound, a user control to active a training mode of the headphones in which the processor operates the microphone to record relevant sounds occurring when the training mode is activated, the processor to subsequently analyze ambient sounds external to the headphones that are received by the microphone and compare those ambient sounds to the recorded relevant sounds and the processor to selectively activate the actuator to uncover at least a portion of the ear of the user to expose the user to ambient sound in response to determining that the ambient sounds match the relevant sounds.

The present specification also describes, for example, a set of headphones. The set of headphones includes a pair of cups, each housing a speaker to be positioned over an ear of a user, a microphone, a processor, an actuator to move a member of at least one of the cups to uncover at least a portion of an ear of the user to expose the user to ambient sound, the processor to subsequently analyze ambient sounds external to the headphones that are received by the microphone and compare those ambient sounds to relevant sounds and the processor to selectively activate the actuator to, based on a priority level assigned to a type of activity in which the user is engaged with the headphones, uncover at least a portion of the ear of the user to expose the user to ambient sound in response to determining that the ambient sounds match the relevant sounds.

The present specification also describes, for example, a method. The method includes activating, via a user control, a training mode of headphones in which a processor operates a microphone of the headphones to record relevant sounds occurring when the training mode is activated, analyzing, via the processor, ambient sounds external to the headphones that are received by the microphone and comparing those ambient sounds to the recorded relevant sounds and selectively activating, via the processor, an actuator to move a member of at least one cup of the headphones to uncover at least a portion of an ear of a user to expose the user to ambient sound in response to determining that the ambient sounds match the relevant sounds.

In the present specification and in the appended claims, the term "relevant sound" means a sound of a specific type to which the system has been programmed or trained to respond by alerting the user that the relevant sound has been detected and/or increasing exposure of the user to ambient sound. Thus, the relevant sound may be an audible indication to signal a processor to selectively activate an actuator to move a member of at least one cup of the headphones to uncover at least a portion of an ear of a user to expose the user to ambient sound. The relevant sound can be a word, a specific sound such as a fire alarm, a doorbell, or a specific person's voice, among others. In an example, after training mode is complete, information about or characterizing the relevant sound is uploaded to a database (along with other metadata) for use by other users.

In the present specification and in the appended claims, the term "match" means a resemblance between an ambient sound and a relevant sound. For example, when an ambient sound resembles a relevant sound within a threshold, a match is determined.

In the present specification and in the appended claims, the term "priority level" means an order of importance assigned to a type of activity in which the user is engaged with the headphones. The priority level may be symbolic such as high, medium or low. The priority level may be a range such as 0 to 10 where 0 signifies a low priority level and 10 signifies a high priority level. In other examples, a priority level may be assigned to relevant sounds.

In the present specification and in the appended claims, the term "sounds" means audible noise that is detected by a microphone and/or a user. Sounds may be perceived as one continuous sound or a series of individual sounds.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1A:
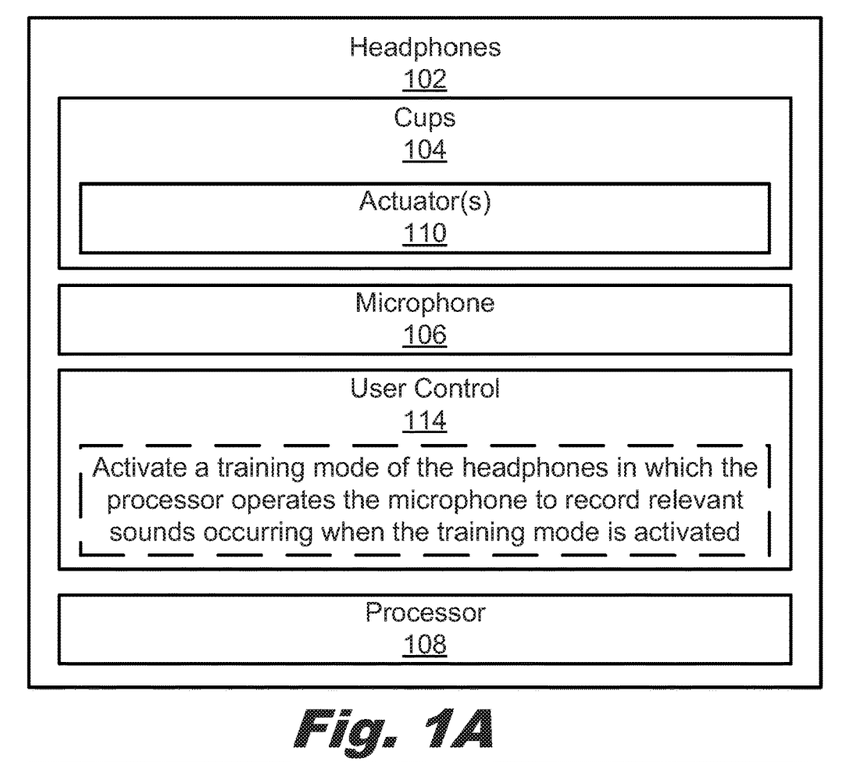
FIG. 1A is a diagram of a set of headphones for alerting a user to an event, according to one example of principles described herein.

Referring now to the figures, FIG. 1A is a diagram of a set of headphones for alerting a user to an event, according to one example of principles described herein. As will be described below, the headphones (102) include a pair of cups (104), a microphone (106), a processor (108), an actuator (110) and a user control (114).

As mentioned above, the set of headphones (102) includes a pair of cups (104), each housing a speaker to be positioned over an ear of a user. The set of headphones (102) includes a microphone (106), a processor (108) and an actuator (110) to move a member of at least one of the cups (104) to uncover at least a portion of the ear of the user to expose the user to ambient sound. The set of headphones (102) includes a user control (114) to active a training mode of the headphones (102) in which the processor (108) operates the microphone (106) to record relevant sounds occurring when the training mode is activated. The processor (108) subsequently analyzes ambient sounds external to the headphones (102) that are received by the microphone (106) and compares those ambient sounds to the recorded relevant sounds. The processor (108) selectively activates the actuator (110) to uncover at least a portion of the ear of the user to expose the user to ambient sound in response to determining that the ambient sounds match the relevant sounds.

Figure 1B:
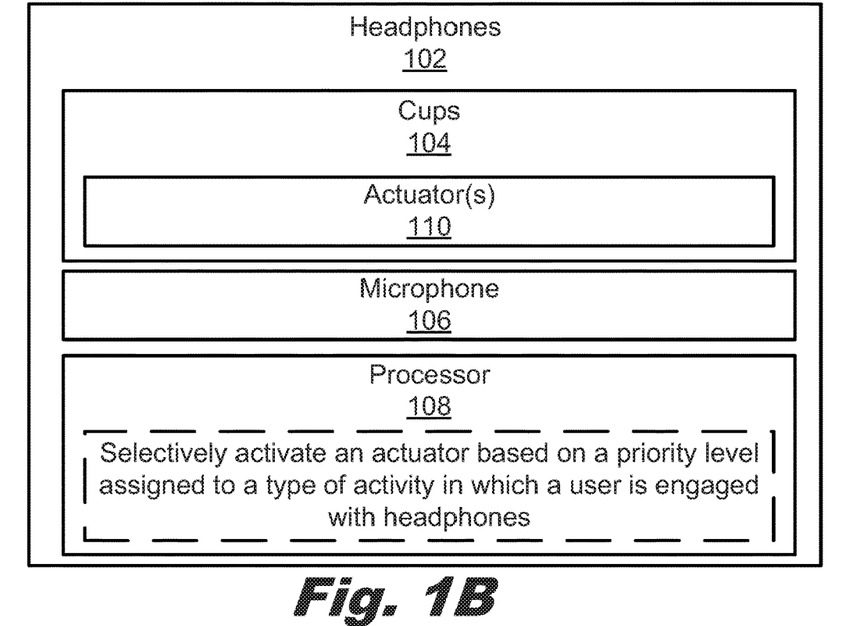
FIG. 1B is a diagram of a set of headphones for alerting a user to an event, according to one example of principles described herein.

FIG. 1B is a diagram of a set of headphones for alerting a user to an event, according to one example of principles described herein. As will be described below, the headphones (102) include a pair of cups (104), a microphone (106), a processor (108) and an actuator (110).

As mentioned above, the set of headphones (102) includes a pair of cups (104), each housing a speaker to be positioned over an ear of a user. The set of headphones (102) includes a microphone (106), a processor (108) and an actuator (110) to move a member of at least one of the cups (104) to uncover at least a portion of an ear of the user to expose the user to ambient sound. The processor (108) subsequently analyzes ambient sounds external to the headphones (102) that are received by the microphone (106) and compares those ambient sounds to relevant sounds. The processor (108) selectively activates the actuator (110) to, based on a priority level assigned to a type of activity in which the user is engaged with the headphones (102), uncover at least a portion of the ear of the user to expose the user to ambient sound in response to determining that the ambient sounds match the relevant sounds.

Figure 2:
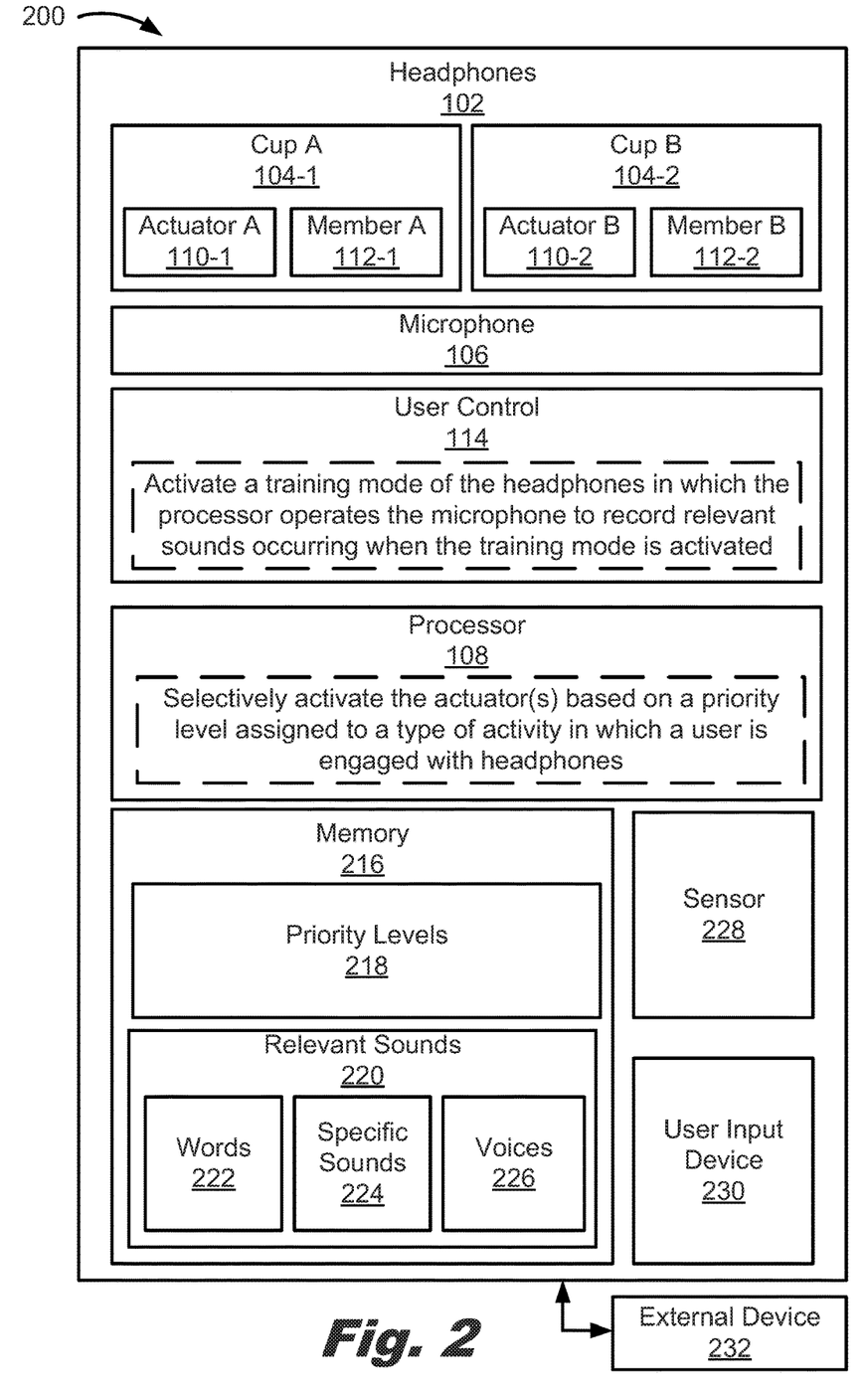
FIG. 2 is a diagram of a set of headphones for alerting a user to an event, according to one example of principles described herein.

FIG. 2 is a diagram of a system for alerting a user to an event, according to one example of principles described herein. As will be described below, the headphones (102) include a pair of cups (104), a microphone (106), a processor (108), an actuator (110), a member (112), memory (216), a sensor (228), a user input device (230) and an external device (232).

As illustrated in FIG. 2, the headphones (102) include a pair of cups (104). For example, the headphones (102) include cup A (104-1) and cup B (104-2). The cups (104) include large pads that surround the outer ear of the user allowing the cups (104) of the headphones (102) to fully seal against the ears of the user to attenuate ambient sounds. For example, cup A (104-1) surrounds the left ear of the user and cup B (104-2) surrounds the right ear of the user.

Each of the cups (104) house a speaker to be positioned over an ear of a user. For example, cup A (104-1) includes speaker A and cup B (104-2) includes speaker B. The speakers are acoustical transducers that allow information to be presented to the user in an audio form.

The headphones (102) include a microphone (106). As will be described below, the microphone (106) records relevant sounds when a training mode of the headset (102) is activated. For example, the headphones (102) are programmed with a training mode. If a user wants to be alerted to a particular type of ambient sound or sounds, the user operates a user control (114) when those sounds are audible to activate the training mode of the headphones (102). In training mode, the processor (108) operates the microphone (106) of the headphones (102) to record the ambient sound or sounds as relevant sounds. In an example, relevant sounds are an indication to signal the processor (108) to selectively activate an actuator(s) (110) to move a member(s) (112) of at least one cup (104) of the headphones (102) to uncover at least a portion of an ear of a user to expose the user to ambient sound.

In an example, the relevant sounds that are recorded can include keywords and phrases such as "excuse me", "hello" and "can you hear me" that are often used to get a user's attention. Again, to record these relevant sounds, the user activates the user control (114) to activate the training mode of the headphones (102). The user, or another person, speaks these keywords and phrases such that the microphone records these relevant sounds. Once recorded, the relevant sounds (220) are stored in memory (216) as data that can be used when comparing ambient sounds with these relevant sounds (220). In an example, these keywords and phrases are stored as words (222) in memory (216).

In an example, the relevant sounds that are recorded can include voices of specific people. To record these relevant sounds, the user activates the user control (114) to activate the training mode of the headphones (102). A target person speaks a number of phrases and/or keywords that may or may not be predetermined and the microphone (106) records the target person's voice such that any ambient sound can be compared against target person's voice (as recorded) to determine if the ambient sound includes the target person's voice. As a result, the headphones (102) can distinguish one voice, such as the user's mom, from another voice, such as the user's sibling using the training mode. Once recorded, the target person's voice is stored in memory (216) as data that can be used when comparing ambient sounds with these relevant sounds (220). In an example, the target user's voice is transduced and vocal characteristics (226) of the user's voice are stored in memory (216). In this way, a subsequently detected voice can be compared to the vocal characteristics of the user to detect a match. In some cases, a filter can be used to represent vocal characteristics.

In an example, the relevant sounds that are recorded can include a specific sound such as a fire alarm or a doorbell. Again, to record these relevant sounds, the user activates the user control (114) to activate the training mode of the headphones (102). The doorbell is rung or a fire alarm is activated such that the microphone records these relevant sounds. Once recorded, the relevant sounds (220) are stored in memory (216) as data that can be used when comparing ambient sounds with the relevant sounds (220). In an example, these sounds are stored in memory (216) as specific sounds (222).

As a result, the user control (114) actives the training mode of the headphones (102) in which the processor (108) operates the microphone (106) to record relevant sounds occurring when the training mode is activated. This allows the headphones (102) to be trained to recognize all types of sounds that are relevant to the user.

In an example, after the training mode is completed, information about the relevant sounds is uploaded to a database (along with other metadata) for use by other users. For example, if user A has a specific model of a phone and user A activates the training mode of the headphones (102) to record relevant sounds of that phone, these relevant sounds are uploaded to the database after the training mode is completed along with other metadata such as phone model information for use by other users. In another example, several different examples of a critical sound, such as a fire alarm, may be downloaded to maximize the probability that a critical sound will be recognized. As a result, the other users are then able to download these relevant sounds from the database and use the previously recorded relevant sounds instead of doing the training themselves.

Thereafter, when the user is wearing the headphones (102) and listening to an audio program through the headphones (102), ambient sounds external to the headphones (102) are received by the microphone (106). In some examples, the audio program is sent from an external device (232) to the headphones (102).

As mentioned above, the headphones (102) include actuator(s) (110). The actuator(s) (110) moves member(s) (112) of at least one of the cups (104) to uncover at least a portion of the ear of the user to expose the user to ambient sound. As will be described below, the processor (108) controls when and what actuator(s) (110) moves which member(s) (112). For example, the processor (108) controls actuator A (110-1) to move member A (112-1). As a result, at least a portion of the left ear of the user is exposed to the user to ambient sound. In another example, the processor (108) controls actuator B (110-2) to move member B (112-2). As a result, at least a portion of the right ear of the user is exposed to the user to ambient sound. In another example, the processor (108) controls actuator A (110-1) and actuator B (110-2) to move member A (112-1) and member B (112-2) respectively. As a result, at least a portion of the left ear and/or right ear of the user is exposed to the ambient sound.

The headphones (102) include the processor (108). The processor (108) subsequently analyzes ambient sounds external to the headphones (102) that are received by the microphone (106) and compares those ambient sounds to the recorded relevant sounds (220). For example, after the training mode is complete, the microphone (106) constantly receives ambient sounds when the headphones (102) are powered on. Once received, the processor (108) analyzes the ambient sounds or portions of the ambient sounds and compares data associated with the ambient sounds against data associated with the relevant sounds (220) stored in memory (216) to determine if the data associated with the ambient sounds matches data associated with the relevant sounds (220).

In an example, the processor (108) selectively activates the actuator (110) to uncover at least a portion of the ear of the user to expose the user to ambient sound in response to determining that the ambient sounds match the relevant sounds. In an example, a match signifies a resemblance between an ambient sound and a relevant sound. For example, when an ambient sound such as "hello" resembles a relevant sound, such as "hello" or "Hi" which is stored in memory (216), a match is determined. The words, vocal characteristics, sounds, etc. may be compared to determine whether there is resemblance.

In some examples, the processor (108) selectively activates the actuator(s) (110) based on a priority level (218) assigned to a type of activity in which the user is engaged with the headphones (102), such that the actuator(s) (110) operates to expose the user to ambient sound in response to determining that the ambient sounds match the relevant sounds only if the priority level of the type of activity is below a threshold. For example, if the user is engaged in a video game tournament, the priority level of the video game tournament may be high such that the processor (108) does not activate the actuator(s) (110) even when ambient sounds match relevant sounds (220).

In another example, a user input device (230) is used to indicate the priority level. For example, the user input device (230) includes three buttons, a low priority button, a medium priority button and a high priority button. When the user selects the low priority button this signals the processor (108) that the type of activity the user is engaged in with the headphones (102) is low. When the user selects the medium priority button this signals the processor (108) that the type of activity the user is engaged in with the headphones (102) is medium. When the user selects the high priority button this signals the processor (108) that the type of activity the user is engaged in with the headphones (102) is high. More information about the priority levels (218) is described in FIG. 5.

The headphones (102) include a touch sensor (228) located on the headphones (102). The touch sensor (228) sends a command to the processor (108) when activated by a user touching the touch sensor (228) to instruct the actuator(s) (110) to toggle the member(s) (112) between open and closed positions. As a result, the user decides when to toggle the member (112) between the open and the closed positions.

As illustrated, the system (200) includes an external device (232). The external device (232) includes, for example, a computer, a laptop, a gaming console, a virtual reality device, a smartphone, a music player, or another external device. In an example, the external device (232) provides audio content to the headphones (102). The external device (232) provides audio content to the headphones (102) via a wired or wireless connection. For example, the external device (232) provides audio content to the headphones (102) via a wired input/output jack of the headphones (102) and the external device (232). For a wireless connection, the external device (232) provides audio content to the headphones (102) via Bluetooth or Wi-Fi.

In an example, when the headphones (102) are connected to the external device (232), the processor (108) receives an indication from the external device (232) as to a type of audio signal being output by the external device (232) to the headphones (102), the type of the audio signal determining the priority level. For example, the external device (232) provides the headphones (102) with the type of device, a location of the device, the type of audio signal being output by the external device (232) among other information such that the headphones (102) can determine they type of activity the user is engaged in with the headphones (102). In an example, the external device (232) may determine the priority level and indicate the priority level to the headphones (102).

A number of examples will be described with reference to FIG. 2. In a first example, the user is engaged within a phone call via the headphones (102). As a result, the activity is the phone call. During the phone call, the microphone (106) receives ambient sounds external to the headphones (102). One of the ambient sounds is "excuse me." The processor (108) and memory (216) analyze the ambient sounds received by the microphone (106). The processor (108) determines that one of the ambient sounds matches a relevant sound (i.e. "excuse me"). The processor (108) determines the priority level assigned a phone call as high. As a result, the processor (106) does not activate the actuator(s) (110) to move the member(s) (112) to expose the user to the ambient sound.

In a second example, the user is listening to music. As a result, the activity is listening to the music. While listening to the music, the microphone (106) receives ambient sounds external to the headphones (102). The ambient sounds are the repetition of "entschuldigung." The processor (108) and memory (216) analyze the ambient sounds received by the microphone (106) as a repetition of a sound. The processor (108) determines that one of the ambient sounds matches a relevant sound (i.e. a repetition of any sound). The processor (108) determines the priority level assigned music is low. As a result, the processor (108) activates the actuator(s) (110) to move the member(s) (112) to expose the user to the ambient sound. As a result, the user does not need to remove the headphones (102) to hear the ambient sounds.

In a third example, the user is playing a video game using a head mounted display. As a result, the activity is playing video games. While playing the video game, the microphone (106) receives ambient sounds external to the headphones (102). The ambient sounds are a fire alarm. The processor (108) and memory (216) analyze the ambient sounds received by the microphone (106) as specific sounds (224). The processor (108) determines that one of the ambient sounds matches a relevant sound (i.e. a fire alarm). The processor (108) determines the priority level assigned a video game is medium. As a result, the processor (108) activates the actuator(s) (110) to move the member(s) (112) to expose the user to the ambient sound. As a result, the user does not need to remove the device (102) to hear the ambient sounds or see their surroundings.

While specific examples have been given as to when and why the processor (108) activates the actuator (110), it should be understood that other examples not given could activate the actuator (110). Further, a user can modify setting of the headphones (102) such that the processor (108) activates the actuator(s) (110) based on these settings. In some examples, the headphones (102) include a button. The button allows the user to manually activate the actuator(s) (110) to expose the user to the ambient sound.

FIGS. 3A to 4B will describe a number of embodiments of the headphones (102) and how members (112) are moved to at least partially expose a user's ear. While FIGS. 3A to 4B illustrate a portion of the headphones (102), it should be understood that the principles apply to both cups (104) and components thereof.

Figure 3A:
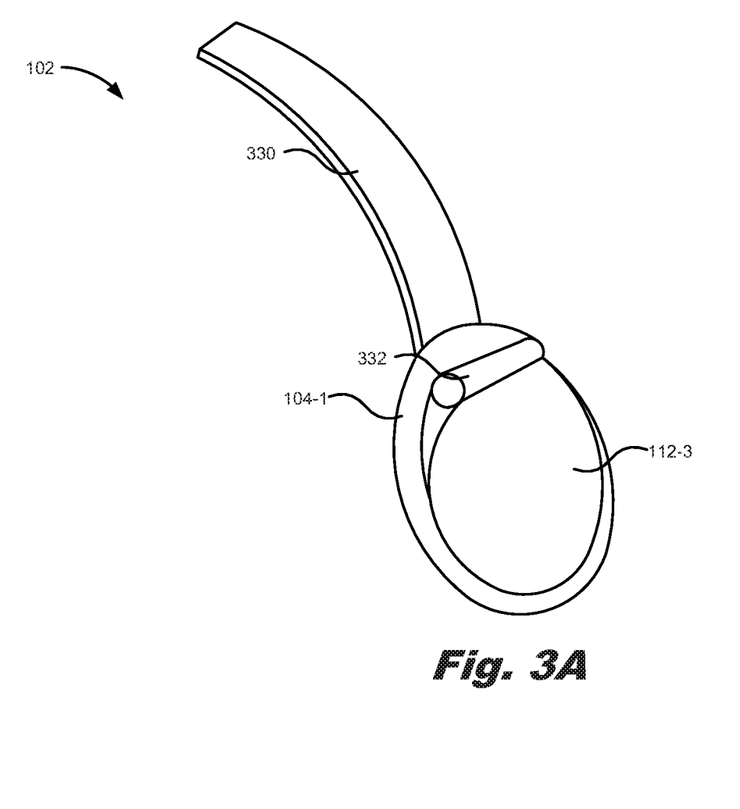
FIG. 3A is a diagram of a set of headphones with a member of the headphones in a closed position, according to one example of principles described herein.

Turning specifically to FIG. 3A. FIG. 3A is a diagram of a set of headphones with a member of the headphones in a closed position, according to one example of principles described herein. As will be described below, the member (112-3) is pivotally connected to the cup (104-1) via a hinge (332).

As illustrated in FIG. 3A, the headphones (102) include a band (330). The band (330) is placed over a top portion of the user's head such that the cups (104) are positioned over the ears of the user. In other examples, the band (330) is placed behind the user's head instead of over the top as described above.

The headphones include the cup (104-1). The portion of the cup (104-1) is connected to a portion of the band (330) as illustrated in FIG. 3A. Again, although only one cup (104-1) is illustrated in FIG. 3A, the headphones (102) include an additional cup as described above.

The cup (104-1) of the headphones is pivotally connected to the member (112-3) via the hinge (332). As illustrated in FIG. 3A, the member (112-3) is in a closed position. As a result, the ambient sounds are attenuated. As will be described in FIG. 3B, when the processor (108) selectively activates the actuator (110), the member (112-3) pivots.

Figure 3B:
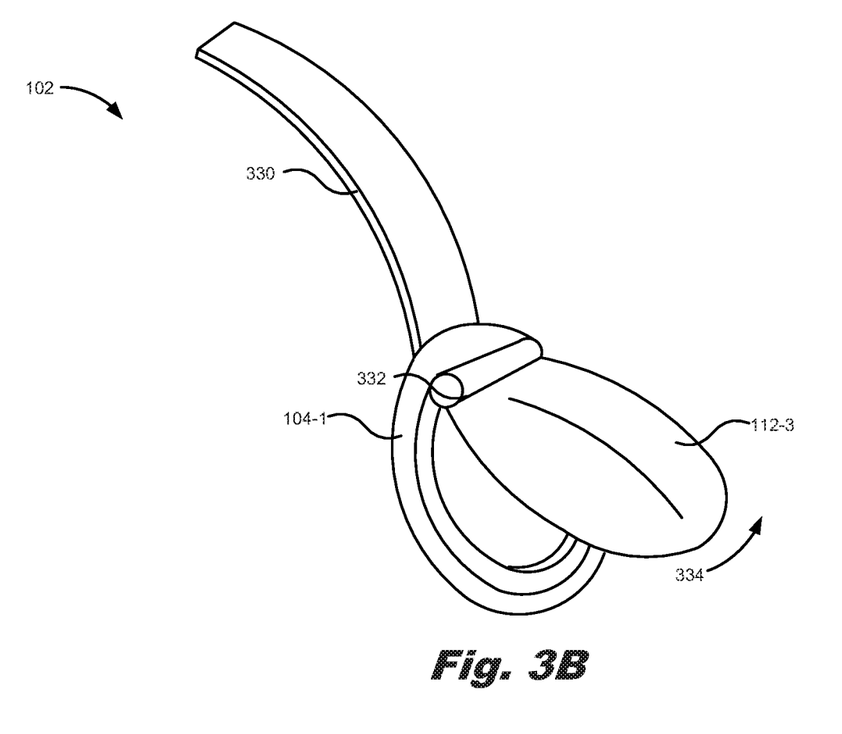
FIG. 3B is a diagram of a set of headphones with a member of the headphones in an open position, according to one example of principles described herein.

FIG. 3B is a diagram of a set of headphones with a member of the headphones in an open position, according to one example of principles described herein. As mentioned above, the member (112-3) is pivotally connected to the cup (104-1) via a hinge (332). When the processor (108) selectively activates the actuator (not illustrated in this figure), the member (112-3) pivots, as indicated by arrow 334 to at least partially expose the user to the ambient sounds as illustrated in FIG. 3B.

While the examples and drawings of FIGS. 3A and 3B illustrate one of the members (112) of the cups (104) pivoting, the other member of the other cup may pivot as well. As a result, one or both of the members (112) for the cups (104) can pivot.

Figure 4A:
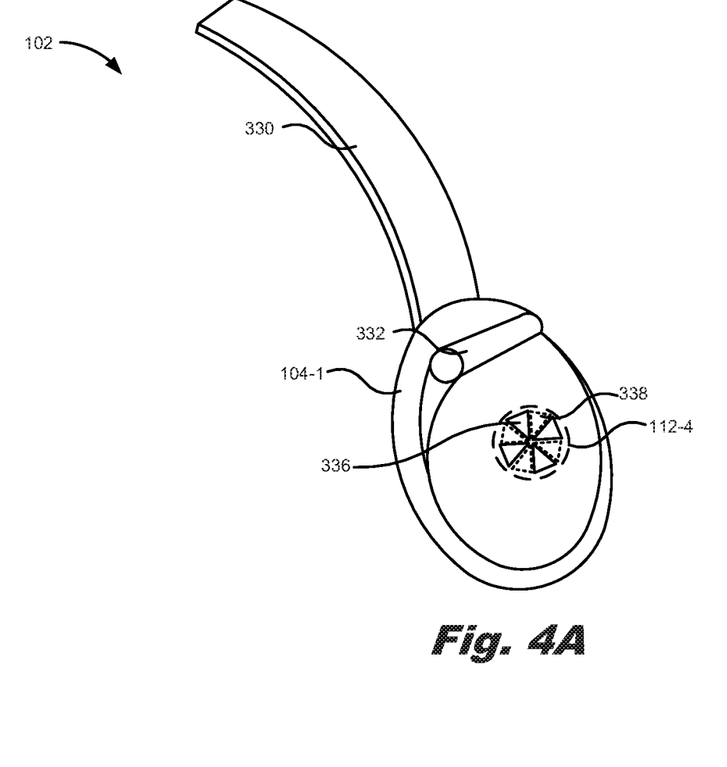
FIG. 4A is a diagram of a set of headphones with a member of the headphones in a closed position, according to one example of principles described herein.

FIG. 4A is a diagram of a set of headphones with a member of the headphones in a closed position, according to one example of principles described herein. As will be described below, the member (112-4) is rotatably connected to the cup (104-1).

As illustrated in FIG. 4A, the headphones (102) include a band (330). The band (330) is placed over a top portion of the user's head such that the cups (104) fully seal against the ears of the user as described above. In other examples, the band (330) is placed behind the user's head instead of over the top as described above.

The headphones include the cup (104-1). The portion of the cup (104-1) is connected to a portion of the band (330) as illustrated in FIG. 4A. Although only one cup (104-1) is illustrated in FIG. 4A, the headphones (102) include an additional cup.

In this example, the cup (104-1) includes a number of cup apertures (336). Further, the member (112-4) includes a number of member apertures (338). As illustrated in FIG. 4A, the member (112-4) is rotated such that cup apertures (336) do not line up with the member apertures (338). As a result, the ambient sounds are attenuated because an aperture is not created via the cup (104-1) and the member (112-4). As will be described in FIG. 4B, when the processor (108) selectively activates the actuator (not illustrated in this figure), the member (112-4) rotates.

Figure 4B:
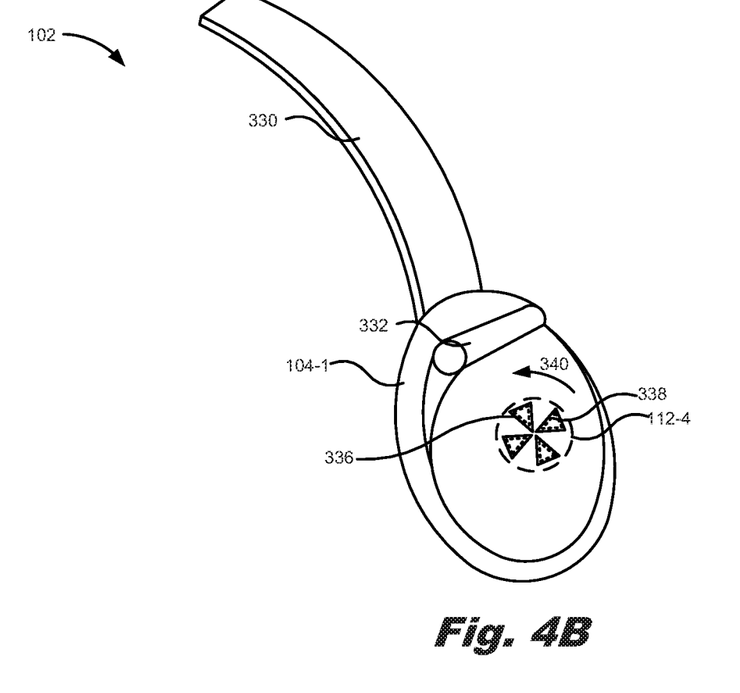
FIG. 4B is a diagram of a set of headphones with a member of the headphones in an open position, according to one example of principles described herein.

FIG. 4B is a diagram of a set of headphones with a member of the headphones in an open position, according to one example of principles described herein. As mentioned above, the member (112-4) is rotatably connected to the cup (104-1). When the processor (108) selectively activates the actuator (110), the member (112-4) rotates relative to the cup (104-1) to open an aperture through the cup (104-1) such that the ear of the user is exposed to the ambient sounds. As illustrated in FIG. 4B, the member (112-4) is rotated such that cup apertures (336) line up with the member apertures (338). As a result, the ambient sounds are passed through to the user's ear.

Figure 5:
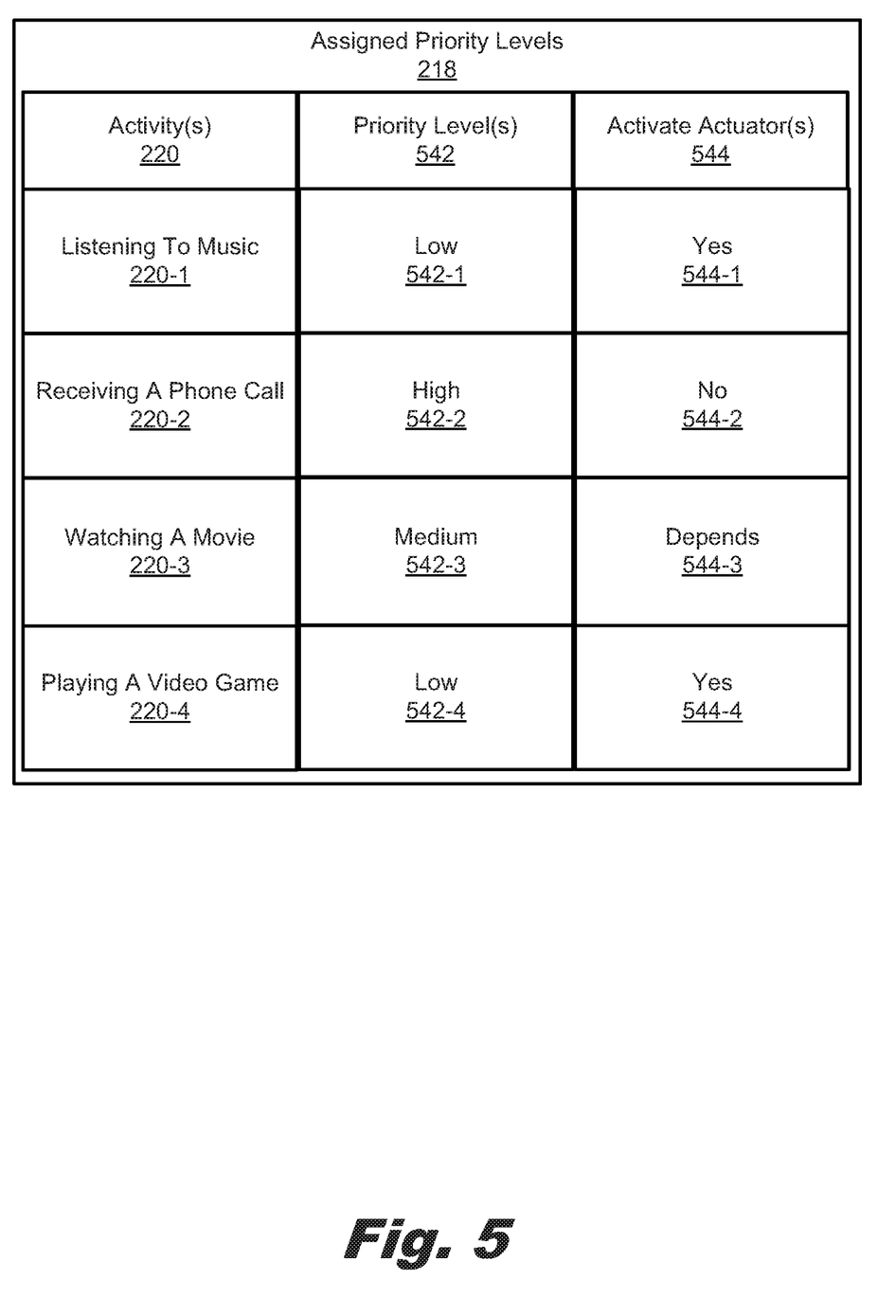

FIG. 5 is a diagram of a number of assigned priority levels, according to one example of principles described herein. As will be described below, activities (220) are assigned a priority level (542).

As illustrated, the assigned priority levels (218) include a number of types of activity (220). Such activities (220) include listening to music (220-1), receiving a phone call (220-2), watching a movie (220-3) and playing a video game (220-4). Each activity (220) is assigned a priority level (542). For example, listening to music (220-1) is assigned a low (542-1) priority level. Receiving a phone call (220-2) is assigned a high (542-2) priority level. Watching a movie (220-3) is assigned a medium (542-3) priority level. Playing a video game (220-4) is assigned a low (542-4) priority level.

As mentioned above, the processor (108) selectively activates the actuator(s) (110) based on a priority level assigned to a type of activity in which the user is engaged with the headphones (102). For example, if listening to music (220-1) is the activity (220) when the ambient sounds match the relevant sounds, the processor (108) activates (yes 544-1) the actuator(s) (110) because listening to music (220-1) is assigned a low (542-1) priority level. If receiving a phone call (220-2) is the activity (220) when the ambient sounds match the relevant sounds, the processor (108) does not activate (no 544-2) the actuator(s) (110) because receiving a phone call (220-2) is assigned a high (542-2) priority level. If watching a movie (220-3) is the activity (220) when the ambient sounds match the relevant sounds, the processor (108) may or may not activate (depends 544-3) the actuator(s) (110) because watching a movie (220-3) is assigned a medium (542-3) priority level. If playing a video game (220-4) is the activity (220) when the ambient sounds match the relevant sounds, the processor (108) activates (yes 544-4) the actuator(s) (110) because playing a video game (220-4) is assigned a low (542-4) priority level.

In some examples, the priority level (218) assigned to the type of activity (220) the user is engaged in with the headphones (102) is determined by receiving an indication from an external device (232) as to the type of activity the user is engaged in with the headphones (102), the indication includes information associated with the external device (232) and media being played on the external device (232). The priority level (218) assigned to the type of activity (220) the user is engaged in with the headphones (102) is determined by matching the indication to priority levels stored in memory to determine the priority level for that type of activity.

While FIG. 5 describes priority levels (542) assigned to activities (220), the priority levels (542) also, or instead, can be assigned to relevant sounds. For example, if a relevant sound is a doorbell ring, a second doorbell ring within a predetermined time of a first may receive a higher priority than the first ring. In another example, a higher pitch or louder voice may receive a higher priority than a calm voice. Further, the priority level of the relevant sound may be compared to the priority level of the activity to determine whether to selectively activate the actuator(s) (110).

Also, based on the priority level, the system determines whether to open the aperture of just one or both cups of the headphones. For example, if the priority level of the activity is low or medium, the system may open the apertures of both cups. If the priority level of the activity is medium or high, the system may open just one of the apertures in the cups so as to be less disruptive to that activity.

Additionally, the system may determine a direction from which the relevant sound is received. In such an example there may be a separate microphone on each cup of the headphones. Consequently, by comparing the amplitude of a sound signal at each microphone, a direction can be assigned from which that sound is arriving. Alternatively, directional microphone(s) may be used which had different sensitivities to sound coming from different directions. In any case, if the aperture of only one cup is to be opened, the system will open the aperture on the cup that is oriented most directly toward the direction from which the relevant sound was detected.

Different relevant sounds may have an assigned priority level. For example, the system may be trained to recognize the voice of a particular person and the ringing of a telephone. Depending on the priority assigned to a relevant sound, the system may decide whether to open the aperture of just one or both cups of the headphones. In this example, the voice the system is trained to recognize may have a higher priority than the ringing of the telephone. Consequently, if the specific person's voice is detected, the system may open the aperture of both cups. Alternatively, if the phone ringing is detected, the system may open the aperture of only one cup. And, that cup may be the one detected as closer to the ringing phone.

Figure 6:
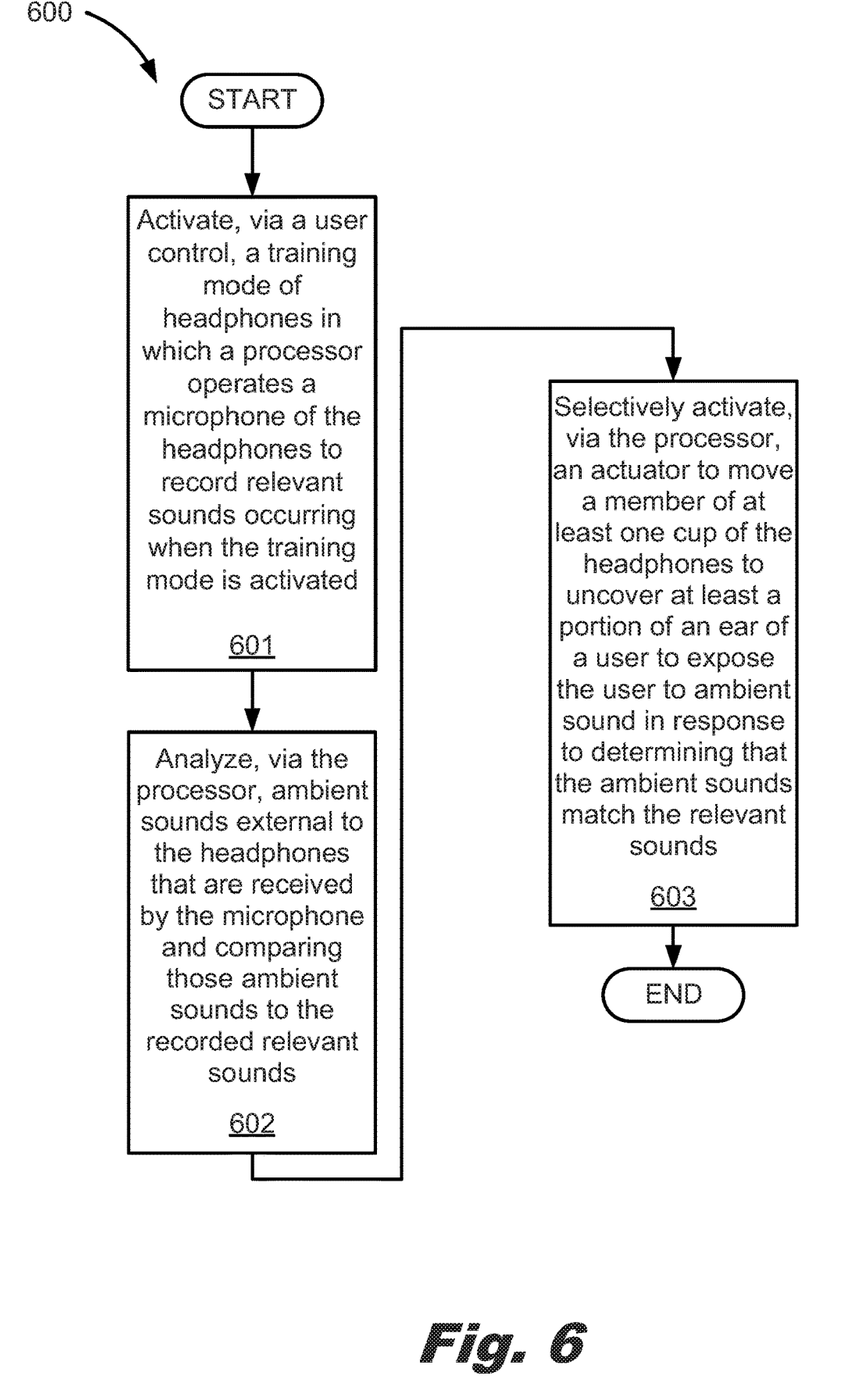
FIG. 6 is a diagram of a number of assigned priority levels, according to one example of principles described herein.

FIG. 6 is a flowchart of a method for alerting a user to an event, according to one example of principles described herein. The method (600) is executed by the systems of FIG. 1A to 4B. The method (600) includes activating (601), via a user control, a training mode of headphones in which a processor operates a microphone of the headphones to record relevant sounds occurring when the training mode is activated, analyzing (602), via the processor, ambient sounds external to the headphones that are received by the microphone and comparing those ambient sounds to the recorded relevant sounds and selectively activating (603), via the processor, an actuator to move a member of at least one cup of the headphones to uncover at least a portion of an ear of a user to expose the user to ambient sound in response to determining that the ambient sounds match the relevant sounds.

As mentioned above, the method (600) includes activating (601), via a user control, a training mode of headphones in which a processor operates a microphone of the headphones to record relevant sounds occurring when the training mode is activated. Is some examples, the training mode is activated when the headphones are first used. In other examples, the training mode is activated when a user presses a user control on the headphones (102). While the training mode is used to record real sounds that are relevant to the user, the headphones may come preloaded with predetermined relevant sounds, such predetermined relevant sounds include sounds produced by emergency vehicles, alarms among others. As mentioned above, the user can upload the recorded relevant sounds (and other metadata) to a database for use by other users.

As mentioned above, the method (600) includes analyzing (602), via the processor, ambient sounds external to the headphones that are received by the microphone and comparing those ambient sounds to the recorded relevant sounds. In some examples, the ambient sounds are stored in memory for a duration of time until the processor can compare the ambient sounds with each of the relevant sounds in memory.

As mentioned above, the method (600) includes selectively activating (603), via the processor, an actuator to move a member of at least one cup of the headphones to uncover at least a portion of an ear of a user to expose the user to ambient sound in response to determining that the ambient sounds match the relevant sounds. The member of at least one cup of the headphones to uncover at least a portion of an ear of a user to expose the user to ambient sound may be the member of FIG. 3A or 4A. In some examples, the member closest to the ambient sound is toggled to an open position.

Figure 7:
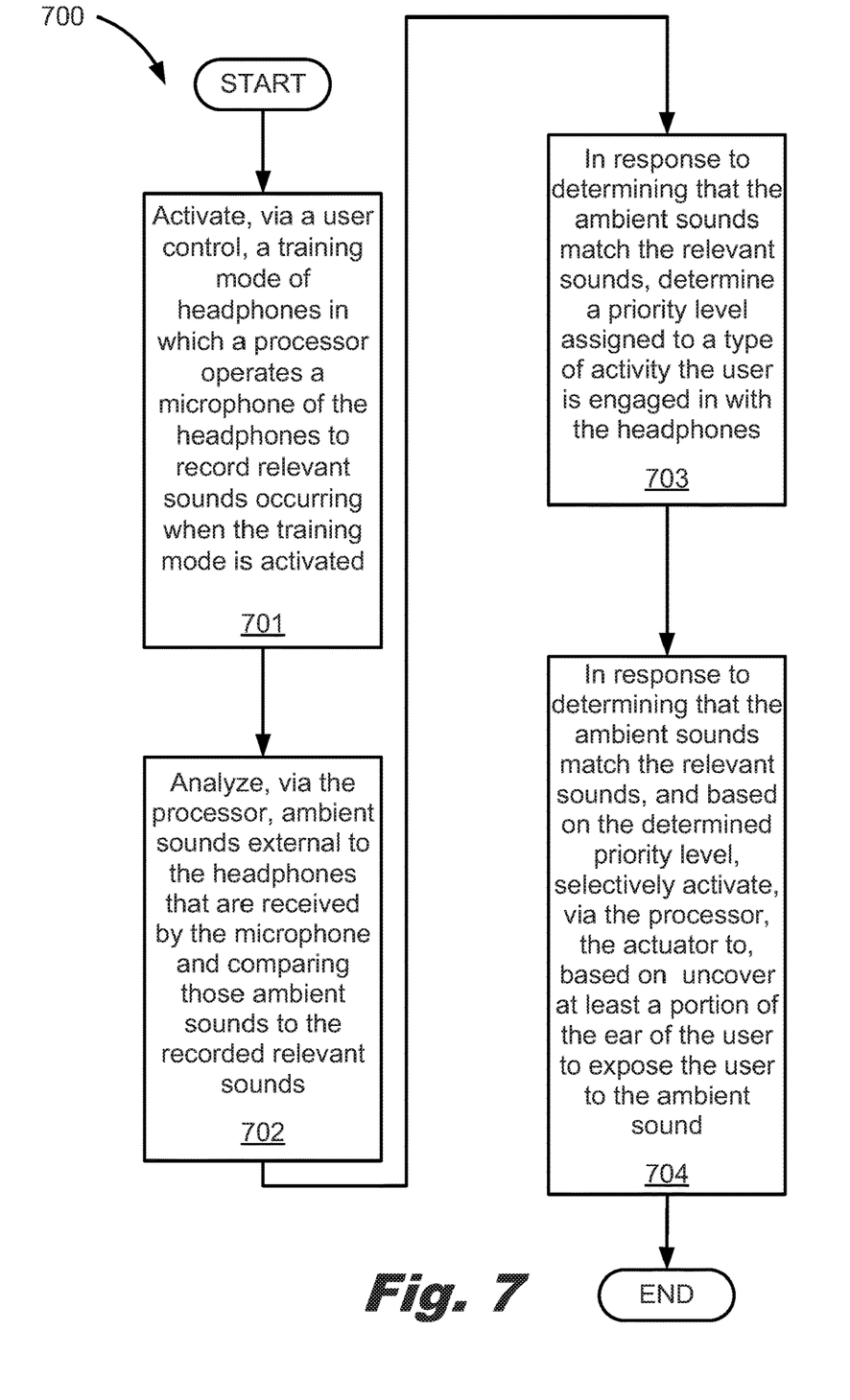
FIG. 7 is a flowchart of a method for alerting a user to an event, according to one example of principles described herein.

FIG. 7 is a flowchart of a method for alerting a user to an event, according to one example of principles described herein. The method (700) may be executed by the systems of FIG. 1A to 4B. The method (700) includes activating (701), via a user control, a training mode of headphones in which a processor operates a microphone of the headphones to record relevant sounds occurring when the training mode is activated. After the training is complete, the system listens to ambient sound. Specifically, the method includes, analyzing (702), via the processor, ambient sounds external to the headphones that are received by the microphone and comparing those ambient sounds to the recorded relevant sounds. In response to determining that the ambient sounds match the relevant sounds, the method includes determining (703) a priority level assigned to a type of activity the user is engaged in with the headphones. And, In response to determining that the ambient sounds match the relevant sounds, and based on the determined priority level, the method includes selectively activating (704), via the processor, the actuator to, based on uncover at least a portion of the ear of the user to expose the user to the ambient sound.

As mentioned above, the method (700) includes activating (704), via the processor, the actuator to, based on a priority level assigned to a type of activity the user is engaged in with the headphones, uncover at least a portion of the ear of the user to expose the user to the ambient sound in response to determining that the ambient sounds match the relevant sounds. A priority level may be symbolic such as high, medium or low. A priority level assigned to a type of activity that is high signifies that this type of activity should not be interrupted when an ambient sound matches a relevant sound. A priority level assigned to a type activity that is medium signifies that this type of activity may or may not be interrupted when an ambient sound matches a relevant sound medium. A priority level assigned to a type of activity that is low signifies that this type of activity should be interrupted when an ambient sound matches a relevant sound. The priority level may be a range such as 0 to 10 where 0 signifies a low priority level and 10 signifies a high priority level. The priority levels are assigned to the type of activities, relevant sounds, or combinations thereof.

The preceding description has been presented to illustrate and describe examples of the principles described. This description is not intended to be exhaustive or to limit these principles to any precise form disclosed. Many modifications and variations are possible in light of the above teaching.

What is claimed is:

1. A set of headphones comprising:
   a pair of cups, each housing a speaker to be positioned over an ear of a user;
   a microphone;
   a processor;
   an actuator to move a member of at least one of the cups to uncover at least a portion of the ear of the user to expose the user to ambient sound;
   a user control to activate a training mode of the headphones in which the processor operates the microphone to record relevant sounds occurring when the training mode is activated;
   the processor to subsequently analyze ambient sounds external to the headphones that are received by the microphone and compare those ambient sounds to the recorded relevant sounds; and
   the processor to selectively activate the actuator to uncover at least a portion of the ear of the user to expose the user to ambient sound in response to determining that the ambient sounds match the relevant sounds.

2. The headphones of claim 1, the processor to selectively activate the actuator based on a priority level assigned to a type of activity in which the user is engaged with the headphones, such that the actuator operates to expose the user to ambient sound in response to determining that the ambient sounds match the relevant sounds only if the priority level of the type of activity is below a threshold.

3. The headphones of claim 1, wherein the member is pivotally connected to the cup via a hinge such that, when the processor selectively activates the actuator, the member pivots to at least partially expose the user to the ambient sounds.

4. The headphones of claim 1, wherein the member is rotatably connected to the cup such that, when the processor selectively activates the actuator, the member rotates relative to the cup to open an aperture through the cup such that the ear of the user is exposed to the ambient sounds.

5. The headphones of claim 2, wherein, when the headphones are connected to an external device, the processor to receive an indication from the external device as to a type of audio signal being output by the external device to the headphones, the type of the audio signal determining the priority level.

6. The headphones of claim 1, wherein the processor is to upload a recording of the relevant sounds to a database after the training mode of the headphones is completed for use by a subsequent user.

7. A set of headphones comprising:
   a pair of cups, each housing a speaker to be positioned over an ear of a user;
   a microphone;
   a processor;
   an actuator to move a member of at least one of the cups to uncover at least a portion of an ear of the user to expose the user to ambient sound;
   the processor to analyze ambient sounds external to the headphones that are received by the microphone and compare those ambient sounds to relevant sounds; and the processor to selectively activate the actuator to, based on a priority level assigned to a type of activity in which the user is engaged with the headphones, uncover at least a portion of the ear of the user to expose the user to ambient sound in response to determining that the ambient sounds match the relevant sounds.

8. The headphones of claim 7, further comprising a user control to activate a training mode of the headphones in which the processor operates the microphone to record sounds occurring when the training mode is activated as the relevant sounds.

9. The headphones of claim 7, wherein, when the headphones are connected to an external device, the processor to receive an indication from the external device as to a type of audio signal being output by the external device to the headphones, the type of the audio signal determining the priority level.

10. The headphones of claim 7, further comprising a touch sensor located on the headphones, the touch sensor to send a command to the processor when activated by a user touching the touch sensor to instruct the actuator to toggle the member between open and closed positions.

11. The headphones of claim 7, wherein the member is pivotally connected to the cup via a hinge such that, when the processor selectively activates the actuator, the member pivots to at least partially expose the user to the ambient sounds.

12. The headphones of claim 7, wherein the actuator selectively opens a member of both cups to selectively expose the user to ambient sound.

13. A method comprising:
activating, via a user control, a training mode of headphones in which a processor operates a microphone of the headphones to record relevant sounds occurring when the training mode is activated;
analyzing, via the processor, ambient sounds external to the headphones that are received by the microphone and comparing those ambient sounds to the recorded relevant sounds; and
selectively activating, via the processor, an actuator to move a member of at least one cup of the headphones to uncover at least a portion of an ear of a user to expose the user to ambient sound in response to determining that the ambient sounds match the relevant sounds.

14. The method of claim 13, further comprising activating, via the processor, the actuator to, based on a priority level assigned to a type of activity the user is engaged in with the headphones, uncover at least a portion of the ear of the user to expose the user to the ambient sound in response to determining that the ambient sounds match the relevant sounds.

15. The method of claim 14, wherein the priority level assigned to the type of activity the user is engaged in with the headphones is determined by:
receiving an indication from an external device as to the type of activity the user is engaged in with the headphones, the indication comprising information associated with the external device and media being played on the external device; and
matching the indication to priority levels stored in memory to determine the priority level for that type of activity.

16. The headphones of claim 1, wherein memory of the processor stores preloaded data indicating additional relevant sounds in addition to those recorded in the training mode.

17. The headphones of claim 1, wherein memory of the processor stores voice data for a specific person, the processor to recognize a voice of the specific person as among the relevant sounds to which the user wants the headphones to respond.

18. The headphones of claim 7, further comprising a user input device to receive user input designated a priority level of content being heard through the headphones.

19. The method of claim 13, further comprising recording a person speaking a keyword or key phrase during the training mode, the keyword or key phrase being a relevant sound to which the user wants the headphones to respond.

20. The method of claim 13, further comprising recording voice data for a specific person during the training mode, wherein the voice of that specific person is among the relevant sounds to which the user wants the headphones to respond.

* * * * *